Feb. 14, 1950 E. C. VANDERGRIFT, SR., ET AL 2,497,379

CRANE ARRANGEMENT FOR WRECKING TRUCKS

Filed Aug. 30, 1946 5 Sheets-Sheet 1

INVENTORS
Excel C. Vandergrift Senior
Alfred Naffin
BY Gerald J. Baldwin
ATTORNEY Feb. 14, 1950 E. C. VANDERGRIFT, SR., ET AL 2,497,379

CRANE ARRANGEMENT FOR WRECKING TRUCKS

Filed Aug. 30, 1946 5 Sheets-Sheet 2

INVENTORS
Ercel C. Vandergrift Senior
BY Alfred Naffin.
Gerald J. Baldwin
ATTORNEY Feb. 14, 1950 E. C. VANDERGRIFT, SR., ET AL 2,497,379

CRANE ARRANGEMENT FOR WRECKING TRUCKS

Filed Aug. 30, 1946 5 Sheets-Sheet 3

INVENTORS

Ercel C. Vandergrift Senior

Alfred Naffin

BY [illegible]

ATTORNEY

Feb. 14, 1950 E. C. VANDERGRIFT, SR., ET AL 2,497,379

CRANE ARRANGEMENT FOR WRECKING TRUCKS

Filed Aug. 30, 1946 5 Sheets-Sheet 4

INVENTORS
Ercel C. Vandergrift-Senior
Alfred Naffin

BY

Grant S. Baldwin
ATTORNEY

Feb. 14, 1950 E. C. VANDERGRIFT, SR., ET AL 2,497,379

CRANE ARRANGEMENT FOR WRECKING TRUCKS

Filed Aug. 30, 1946 5 Sheets-Sheet 5

INVENTORS
Excel C. Vandergrift Senior
Alfred Naffin

BY

Gerald J. Baldwin
ATTORNEY

Patented Feb. 14, 1950 2,497,379

UNITED STATES PATENT OFFICE 2,497,379

CRANE ARRANGEMENT FOR WRECKING TRUCKS

Ercel C. Vandergrift, Sr., and Alfred Naffin, Detroit, Mich.

Application August 30, 1946, Serial No. 693,942

11 Claims. (Cl. 214—86)

This invention relates to improvements in a crane arrangement for a wrecking truck. It is an object of the invention to provide a crane arrangement upon a vehicle wherein the crane is so arranged that it may be safely employed for lifting heavy weights such as the front or rear end of a disabled car, and wherein the vehicle may be safely set in motion when the crane is under load.

Another object of the invention is to provide such a crane arrangement for a wrecking truck including a two-piece boom the outer or rear portion of which may be folded to rest upon the inner or forward portion when not in use; wherein supporting means are provided to which the front boom portion is pivoted and said means includes a member in which both boom portions may rest when not in use; and wherein a brace is pivoted on the supporting means for holding the boom in its raised, operative position.

A further object of the invention is to provide such a crane arrangement for a wrecking truck wherein the front boom portion, when in operative position, and the axis of the brace are so located relative to the rear axle of the vehicle that an imaginary line extending at right angles from the said front boom portion substantially centrally of its length passes both through the pivot axis of the brace and through the axis of the said rear axle, thereby eliminating any tendency for the vehicle to tip when a heavy load is being raised by the crane, and insuring that no tipping tendency develops when the vehicle is in motion and the load, such as the front end of a disabled car, is supported by the crane.

Another object of the invention is to provide a crane arrangement for a wrecking truck including a lift plate adapted to be raised or lowered by the crane behind the vehicle, wherein the lift plate is mounted for movement about two axes disposed at right angles to one another and is maintained a predetermined distance from the rear of the vehicle by a spacer bar to insure proper spacing between the vehicle and a disabled car, or other heavy weight, raised by the crane for towing.

Another object of the invention is to provide such a crane arrangement for a wrecking truck wherein the boom is arranged to fold upon itself and when folded to assume a horizontal position contiguous to the main carrier, and hinged flooring portions are provided to extend across the body interior over the folded boom to form a flat bottom for carrying necessary equipment, tools and the like.

Having thus broadly stated some of the objects and advantages of the invention we will now proceed to describe it in detail with the aid of the accompanying drawings, in which.

Figure 1:
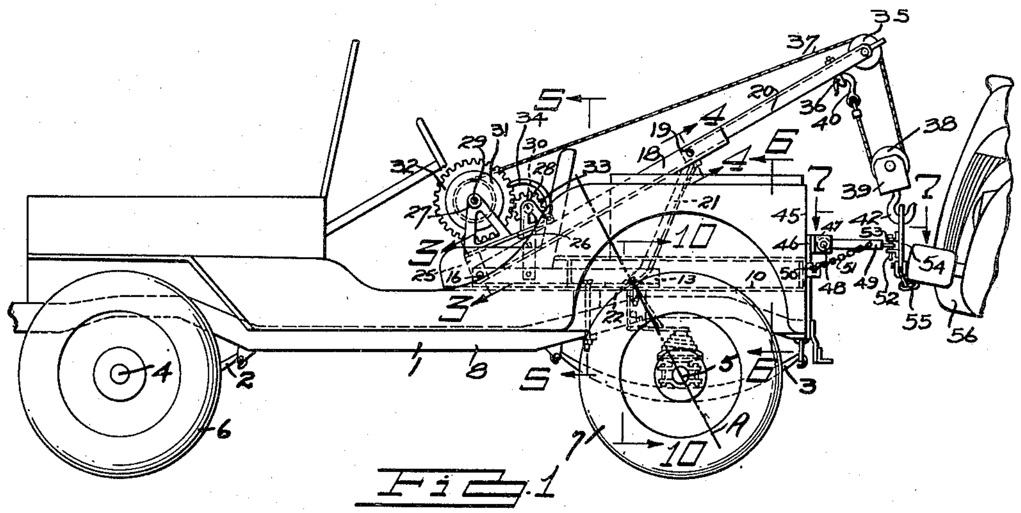
Figure 1 is a side elevation of a vehicle equipped with the invention.

Figures 3, 4, 5, 6 and 7 are sections on the lines 3—3, 4—4, 5—5, 6—6 and 7—7 respectively of Figure 1.

Figure 8:
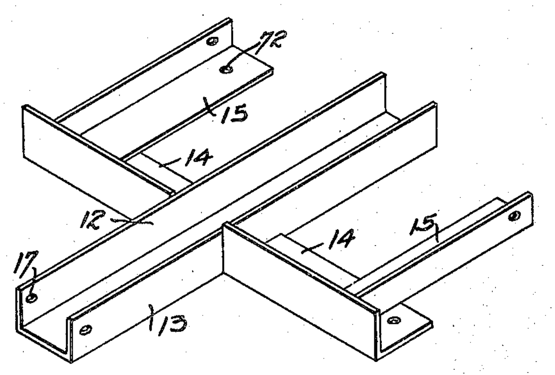

Figure 8 is a perspective view showing the supporting frame for the boom on which the brace for the latter is also pivoted.

Figure 9:
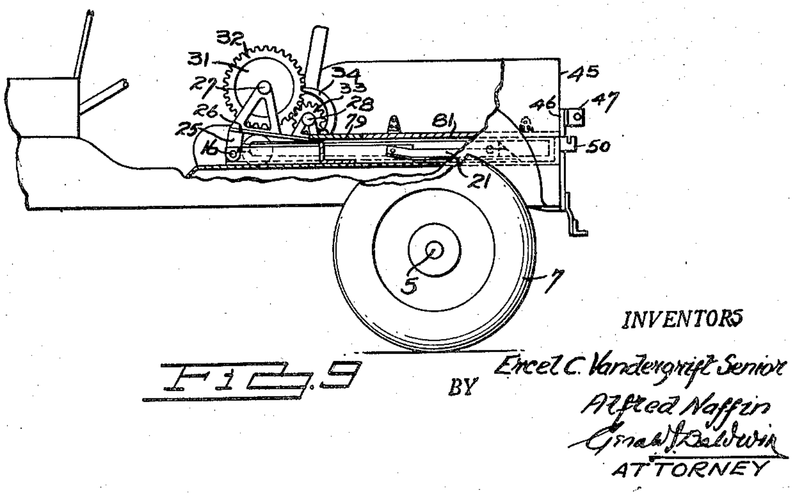

Figure 9 is a side view, partly in section, showing the rear of the vehicle.

Figure 10:
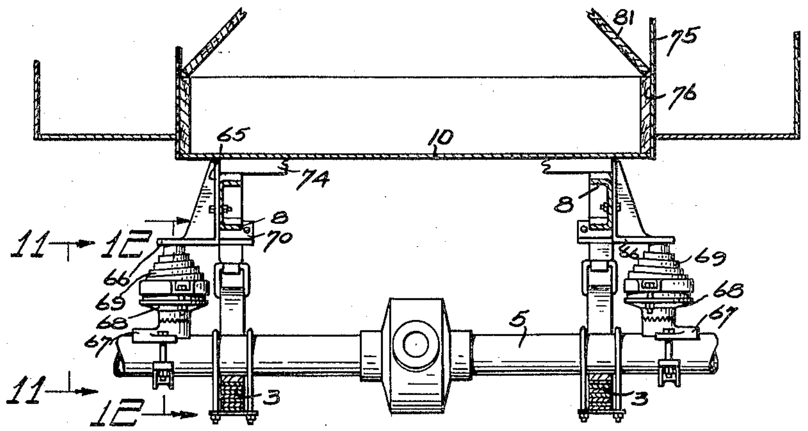

Figure 10 is a view of the rear axle taken on the line 10—10 of Figure 1 and enlarged, showing auxiliary springs and bearing plates projecting from the longitudinal carrier members resting thereon.

Figure 11:
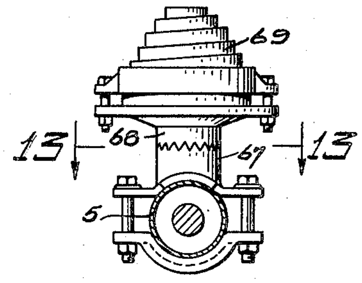
Figures 13, 17:
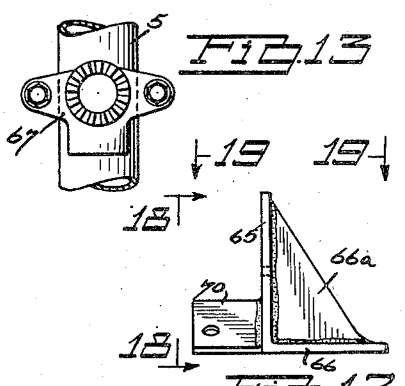
Figure 12:
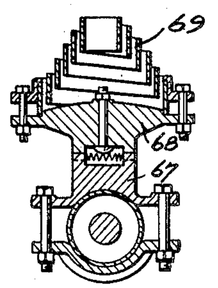

Figures 11 and 12 are views on the lines 11—11 and 12—12 respectively of Figure 10, and Figure 13 is a view on the line 13—13 of Figure 11.

Figure 14:
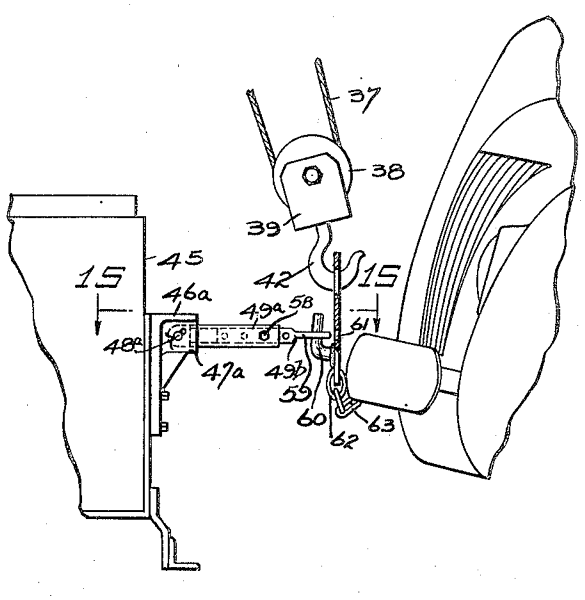

Figure 14 is a side view showing a modification of the spacer bar arrangement.

Figure 15:
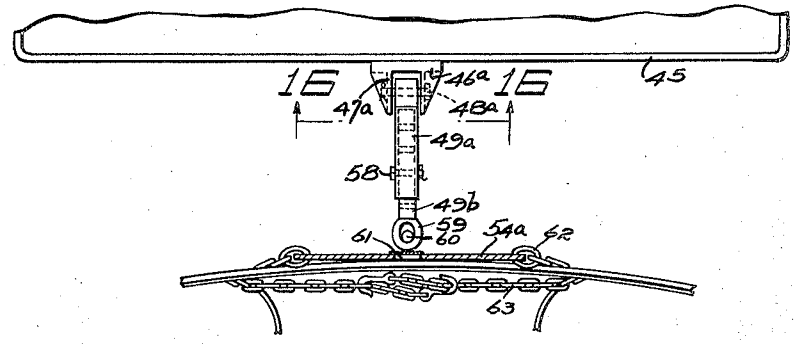

Figure 15, is a section on the line 15—15 of Figure 14, and

Figure 16:
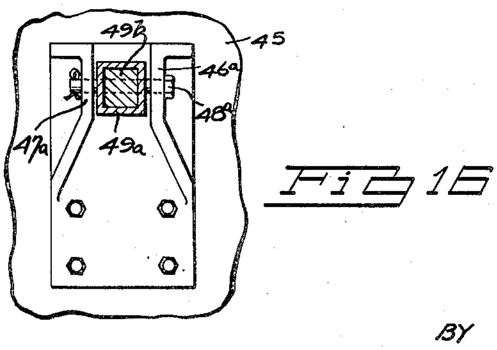

Figure 16 is an enlarged section on the line 16—16 of Figure 15.

Figure 18:
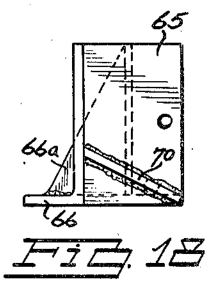
Figure 19:
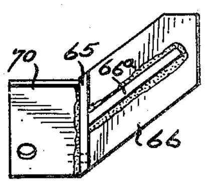

Figure 17 is an enlarged detail showing the plate inserted between the frame and one supplemental spring, Figure 18 is a side view, and Figure 19 is a plan view thereof.

Referring to the drawings, 1 designates a conventional vehicle carrier or frame, 2 and 3 are ordinary front and rear springs secured both to the carrier 1 and to front and rear axles 4 and 5 having front and rear wheels 6 and 7 respectively thereon. Intermeriately of its length the longitudinal members 8 of the carrier, which in the present instance are of channel section, are spaced by a reinforcing member 9 of box section the opposite sides of which are downwardly and outwardly inclined intermediately of their width so that the central portion of the reinforcing member is higher. Spaced above the member 9 is a plate 10 of such width that it extends outwardly of both the longitudinal carrier members 8. Mounted between the underside of the plate 10 centrally of its width and the reinforcing member 9 is a shallow bolster 11, and extending between the sides of the plate 10 and the top of the longitudinal members 8 are thicker bolsters 11a.

Figure 2:
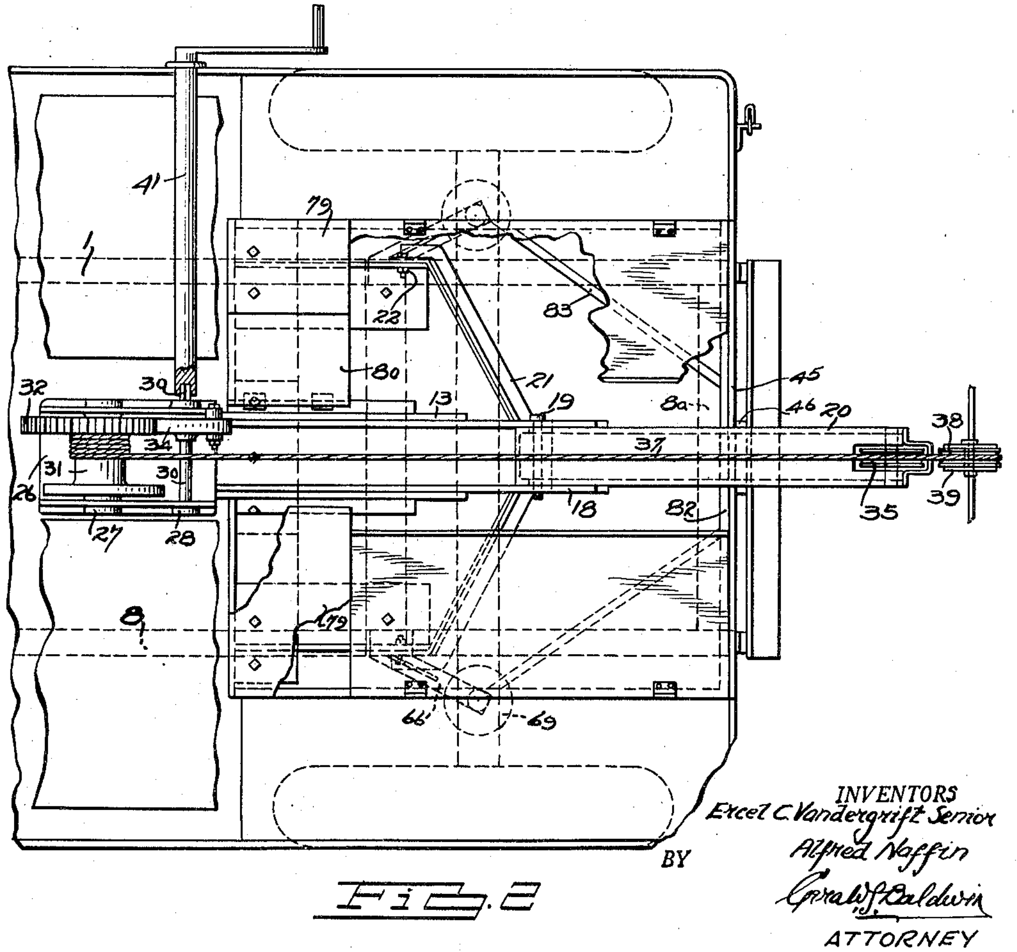
Figure 2 is an enlarged plan view showing the rear portion of the vehicle.
Figure 3:
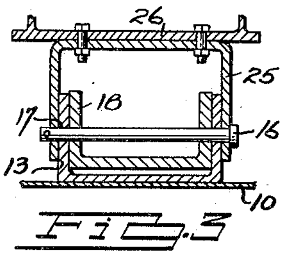
Figure 4:
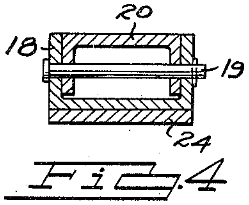
Figure 5:
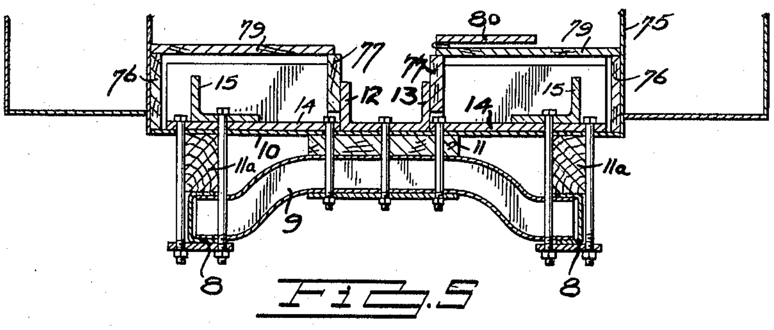
Figure 6:
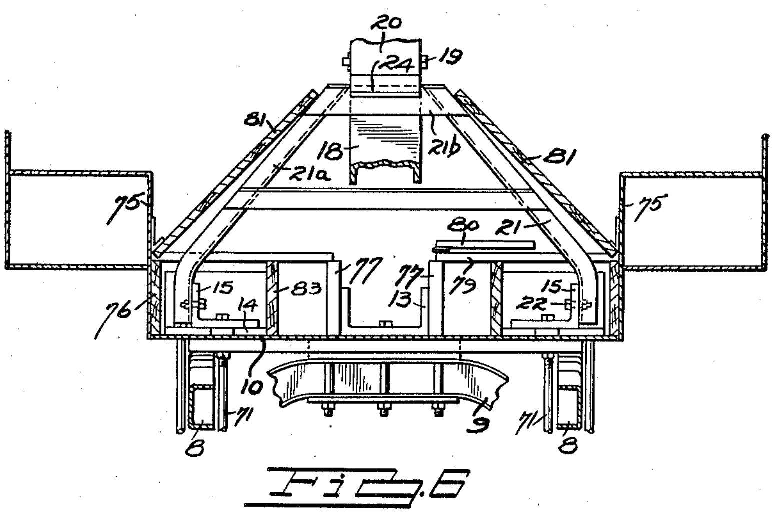

Mounted on the plate 10 is a supporting frame 12 (Figure 8) including a channel member 13 which extends centrally and longitudinally along the said plate, aligned cross members 14 extending laterally from opposite sides of the channel member 13 intermediately of the length of the latter and welded or otherwise suitably secured thereto, and angle members 15 parallel with and spaced from opposite sides of the channel member 13 which extend rearwardly from and are suitably secured to the cross members 14. Pivotally supported on a pin 16 extending through opposed openings 17 formed through opposite sides of the channel member 13 is the front extremity of a front boom portion 18 which is also preferably of channel section and is adapted to lie within the channel member 13. Pivoted on a pin 19 extending through aligned openings formed through the front boom portion adjacent its rear extremity is a rear boom portion 20 which is adapted either to project rearwardly from and in alignment with the front boom portion 18 as shown in Figures 1 and 2 or to be forwardly turned about the pin 19 to lie within the front boom portion as shown in Figure 9. When outwardly extended the rear boom portion 20 is held in alignment with the front portion 18 by the rear extremity of the latter upon which the adjacent end of the rear portion 20 rests. A substantially V-shaped brace 21 has its extremities pivotally mounted on horizontally aligned pins 22 which pass through openings formed through the vertical sides of the angle members 15. Arranged transversely on the underside of the front boom portion 18 adjacent its rear extremity is a stop 23 against the front face of which the brace 21 bears when the boom is in its operative position, that is when it is upwardly and rearwardly inclined. It will be noted that when the boom is not in use the front portion 18 lies in the channel member 13 and the rear portion 20 lies in the said front portion 18. Moreover at that time the brace 21 rests upon the plate 10 in a substantially horizontal position. While the brace may be of any preferred construction it consists in the present instance of two downwardly projecting angle members 21a connected at their outer extremities by a plate 21b. It will thus be noted that an imaginary line A passing at right angles thereto through the front boom portion 18 and substantially bisecting the latter also passes through the axes both of the pivots 22 and of the rear axel 5. Consequently the load supported by the boom is transmitted to and through the rear axle without fear of causing the vehicle to tip when the latter is either stationary or in motion.

Mounted also on the pin 16 for pivotal movement with the front boom portion 18 are spaced arms 25 depending from the base 26 of a winch. The length of the arms is such that the front of the base is spaced above the top of the front boom portion 18 while its rear extremity rests upon the said front boom portion. Mounted transversely of the winch base in suitable bearings 27 and 28 are shafts 29 and 30 respectively, and 41 denotes a removable crank on one extremity of the shaft 30 for turning the latter. Mounted on the shaft 29 is a drum 31 having a gear 32 secured to one side thereof, and fixed on the shaft 30 is a pinion 33 coacting with the gear 32. 34 indicates a ratchet to engage the teeth of the gear 32 and hold the latter against rotation; however other gearing arrangements may obviously be employed for turning the drum 31. Rotatably supported on the outer extremity of the rear boom portion 20 is a sheave 35, and forwardly of the latter a downwardly extending eye 36 is mounted upon the said portion 20. Wound around the drum 31 is a cable 37 one extremity of which extends over the sheave 35, around the underside of a pulley 38 rotatably supported on a block 39 and terminates in a hook 40 which is normally in engagement with the eye 36 so that as the cable is wound onto the drum 31 by rotation of the crank 41 the block 39 and a hook 42 depending therefrom are raised.

Figure 7:
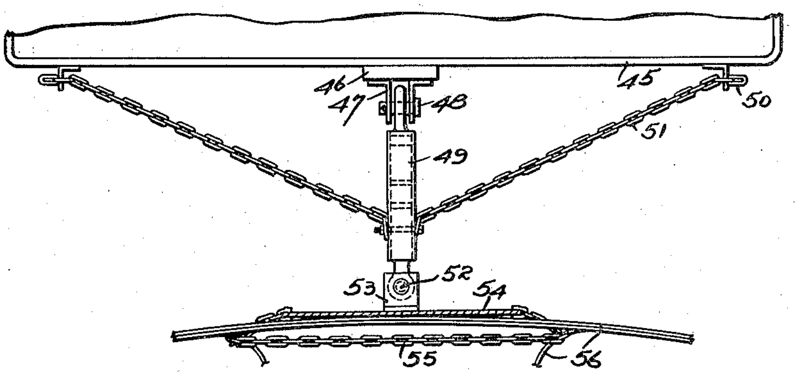

Referring now to the carrier plate mounting shown in Figures 1 and 7. Supported both by the back 45 of the vehicle body and by a transverse carrier member 8a extending between the rear extremities of the longitudinal carrier members 8 is a vertical plate 46. Projecting rearwardly from the latter are spaced lugs 47 having a pin 48 extending horizontally through them and also through a rearwardly projecting spacer bar 49 which is thus mounted for vertical movement. In order to insure that the bar 49 be held at right angles to the back of the body at all times hooks 50 are mounted on opposite sides of the said back 45 each to engage one end of a chain 51 the opposite extremity of which is secured to the adjacent side of the bar 49 toward its rear extremity. Extending vertically through the rear extremity of the spacer bar 49 is a pin 52 which also engages vertically spaced lugs 53 projecting forwardly from a carrier plate 54. Centrally of its width and above the lugs 53 the plate is apertured to receive the hook 42. Suitably secured to each side of the carrier plate 54 is a chain 55 for attachment in any preferred manner to the article to be lifted and towed such as the front end of a disabled car 56.

In the modification shown in Figures 14 and 16 inclusive, a bracket 46a is mounted upon the back 45 of the vehicle body, and formed integral with the bracket are horizontally opposed lugs 47a spaced to receive a spacer bar 49a, preferably of rectangular section, between them. This bar is pivotally mounted on a horizontal pin 48a which also extends through the lugs 47a. Telescopically mounted in the bar 49a which is tubular from its rear extremity is an inner bar 49b. Formed through the bar 49a are opposed openings for the passage of a bolt 58, and formed through the inner bar 49b are a plurality of spaced holes for the passage of the bolt, so that the total length of the spacer bar may be varied to suit different conditions. Integral with and projecting rearwardly from the rear extremity of the inner spacer bar is a link 59 to engage a hook 60 extending forwardly and upwardly from the carrier plate 54a, and provided through the latter is an aperture 61 partway into which the link 59 may extend. However the rear portion of the sides of the link 59 are of forwardly increasing spacing so that the link can only enter a short distance into the aperture before its sides contact the sides of the latter. Thus during deceleration of the vehicle a rearward pressure is exerted against the carrier plate 54a by the link 59. Secured as by a link 62 which passes through an opening formed through the carrier plate on each side thereof is a chain 63. These chains are employed for engagement in any conventional manner with one end of a car to be lifted and subsequently towed by the vehicle. In the arrangement just described it will be noted that accidental detachment of the spacer bar 49a from the carrier plate 54a is practically impossible because when under tension the bar tends to remain horizontal, and moreover, as will be seen from Figure 14, the hook 60 is upwardly somewhat inclined toward the carrier plate; and when the bar is under compression the link 59 enters the plate aperture 61 whereby upward movement of the rear end of the bar is rendered impossible.

Opposed bearing plates 65 (Figures 17, 18 and 19) are secured to the outer faces of the longitudinal carrier members 8 forwardly of the rear axle 5 and immediately beneath the pivot mountings of the V-shaped brace 21. Formed integral with the bearing plates 65 are inward projections 70 which bear against the undersides of the said members 8, and since the latter are rearwardly and upwardly inclined where they are contacted by the said projections the latter are similarly inclined to rest against the members throughout their length. The projections 70 are also made wider than the members 8 to extend inwardly beyond the latter and receive bolts 71 which pass downwardly through openings 72 formed through the angle members 15 and have nuts thereon tightened against the undersides of the projections 70. Also formed integral with the plates 65 are horizontal outwardly disposed flanges 66 braced at 66*a* which extend rearwardly over the rear axle 5. These flanges are widely spaced from one another so that each one is close to one of the rear wheels of the vehicle. Secured to the rear axle 5 and projecting vertically upward therefrom are annular supports 67 which are radially serrated on their upper faces. Pads 68 similarly radially serrated on their undersides are mounted on the supports 67 and carry auxiliary coil springs 69 of upwardly decreasing diameter. The upper extremities of these springs bear against the undersides of the flanges 66. When the crane is in use the weight of the car or other article lifted is transmitted very largely onto the rear axle 5, and the auxiliary springs 69 transmit this extra load and prevent over-loading of the springs 7 normally provided upon the vehicle. It will be noted that the auxiliary spring arrangement is such that there is no tendency for the vehicle to tip: Firstly because the portions of the plates 66 contacted by the springs 69 are materially rearward of the points of attachment of the bearing plates 65 to the members 8 and angle members 15 so that any pressure exerted by the springs 69 upon the frame is in a longitudinal direction; and secondly, because the flanges 66 and the springs 69 are so widely spaced and are located adjacent the rear wheels of the vehicle. It will also be noted that a reinforcing bar 74 is secured at opposite extremities to the inner faces of the plates 65 and extends transversely between them, and the upper side of the bar rests against the underside of the plate 10. Consequently distortion of the said longitudinal members by pressure exerted upon the bearing plates 65 which are in transverse alignment with the said reinforcing bars 74 is prevented.

Extending vertically upon opposite sides of the plate 10 are inner body sides 75 and resting against the inner faces of the latter and upon the said plate are outer supports 76. 77 denotes inner supports of the same height as the supports 76, these supports 77 are secured against the outer faces of the channel member 13 intermediately of the length of the latter and are higher than the said member. Front flooring sections 79 resting on the outer supports 76 extend inwardly from each body side 75 partway over the adjacent inner support 77. Hinged along the inner longitudinal margin of one of the flooring sections 79 is a central flooring strip 80 which extends, when downturned, over the channel member 13 and partway over both of the inner supports 77 on which it is adapted to rest. The rear portion of the body interior, when the boom is lowered, is covered by rear flooring sections 81 each hinged on one of the body sides 75. Each section 81 is adapted to extend to the longitudinal center line of the vehicle. These rear flooring sections 81 are adapted to be supported by the outer supports 76, a transverse support 82 secured against the inner face of the back 45 of the body, by diagonal supports 83 mounted on the plate 10, and by the upper margins of the rear boom portion 20 when the latter is forwardly folded over the front boom portion 18. These flooring sections 79 and 81 and the central flooring strip 80 together form a continuous floor within the body of the vehicle so that any desired material may be easily loaded and transported thereon when the boom is lowered.

From the foregoing it will be clearly seen that we have devised a simple and compact crane arrangement upon a vehicle so that loads materially heavier than the vehicle and the crane thereon may be quickly and easily lifted and towed by the said vehicle; wherein the rear boom portion 20 is adapted to be turned forwardly onto the front boom portion 18 when not in use so that the entire boom rests upon the main carrier in a substantially horizontal position and does not project rearwardly of the vehicle body; wherein the boom and its supporting means when raised are so positioned that the vehicle will not tip when a heavy load is supported thereby and the vehicle is in motion; wherein the hook 42 which supports the carrier plate 54, or 54*a*, in all adjusted positions of the spacer bar 49, or 49*a*, is maintained rearwardly of the sheave 35 so that the cable 37 tends to pull the carrier plate forward and retain the link 59 in engagement with the plate aperture 61; and wherein the auxiliary springs 69 and the bearing plates 65 are so arranged that a force is exerted longitudinally of the carrier members 8 when the crane is under load.

While in the specification the preferred forms of construction have been described and shown it is understood that alterations and modifications may be made thereto provided they fall within the scope of the appended claims.

What we claim is:

1. A crane arrangement of the character described comprising a vehicle having a supporting frame thereon, a front boom portion pivoted thereon and adapted to extend upwardly and rearwardly from its pivot mounting, a rear boom portion pivoted on the front boom portion to extend rearwardly in alignment with the latter, said rear boom portion being also adapted to be turned forwardly about its axis to rest upon the front boom portion, a brace pivoted on the vehicle in front of the rear axle thereof adapted to support the boom portions in their upward and rearward positions, and hoisting means depending from the rear boom portion.

2. A crane arrangement of the character described comprising a vehicle having a supporting frame thereon, a front boom portion pivoted thereon adapted to extend upwardly and rearwardly from its pivot mounting, a rear boom portion pivoted on the front boom portion to extend rearwardly in alignment with the latter, said rear boom portion being also adapted to be turned forward about its axis to rest on the front boom portion, a brace pivoted on the supporting frame in front of the rear axle, means on the front boom portion for engaging the brace whereby said boom portion is held in its inclined position, a winch including a rotary drum mounted on the vehicle, a sheave rotatable on the rear boom portion, a cable wound around the drum and passing over the sheave and means on the cable for engaging an article to be lifted.

3. A crane arrangement of the character described comprising a vehicle, a supporting frame thereon including a longitudinal channel member, a front boom portion pivoted on the latter adapted either to lie therein or to project upwardly and rearwardly from its pivot mounting, a rear boom portion pivoted on the front boom portion adjacent its rear extremity, said rear boom portion being adapted either to project from and in alignment with the front boom portion or to be folded forward to rest thereon, a brace pivoted on the supporting frame, means on the front boom portion adapted to be engaged by said brace to retain said portion in its upwardly inclined position, said front boom portion being shorter than the length of the vehicle and terminating forwardly of the rear extremity of the latter, said rear boom portion when in alignment with the front boom portion projecting rearwardly beyond the vehicle, a winch having a rotary drum thereon pivoted on the mounting for the front boom portion, a sheave rotatable on the rear boom portion, a cable wound around the drum and passing over the sheave, and means on the cable for engaging an article to be lifted.

4. A crane arrangement of the character described comprising a vehicle including a main carrier having a longitudinal carrier member extending along each side, a front and a rear axle, springs supporting the main carrier on the front and rear axles, a boom supported on the main carrier and extending rearwardly thereof, hoisting means depending from the boom, bearing plates on the main carrier having flanges projecting rearwardly therefrom, and auxiliary springs mounted on the rear axle for exerting upward pressure on the flanges.

5. In a crane arrangement of the character described, the combination of a vehicle including a main carrier having a carrier member extending along each side, a front and a rear axle, springs supporting the main carrier on the front and rear axles, a supporting frame on the main carrier, a boom pivoted on the supporting frame forwardly of the rear axle, a brace pivoted on the supporting frame forwardly of the rear axle and rearwardly of the pivot mounting of the boom, bearing plates on the carrier members immediately beneath the pivot mountings of the brace, flanges projecting rearwardly from the bearing plates, and auxiliary springs mounted on the rear axle for exerting upward pressure on the flanges.

6. In a crane arrangement upon a vehicle, a boom extending upwardly and rearwardly from the vehicle, a spacer bar pivoted about a horizontal axis on the vehicle and projecting rearwardly thereof, a carrier plate connected to the rear extremity of the spacer bar for movement about a vertical axis, and hoisting means carried by the boom and connected to the carrier plate for raising and lowering the latter and means on said plate adapted to be engaged by said spacer bar upon deceleration of the vehicle to prevent detachment of the plate from the bar.

7. In a crane arrangement upon a vehicle, a boom extending upwardly and rearwardly from the vehicle, a spacer bar on the rear of the vehicle mounted thereon for movement about a transverse axis and projecting rearwardly from said vehicle, a carrier plate to which a car to be towed is adapted to be secured, hoisting means carried by the boom and extending therefrom having means thereon for supporting the carrier plate, an upwardly projecting hook on the carrier plate, engaging a vertical opening through the spacer bar, and said plate having an aperture therein for engagement by the rear extremity of the spacer bar upon deceleration of the vehicle to prevent detachment of the hook from spacer bar.

8. In a crane arrangement upon a vehicle, a boom extending upwardly and rearwardly of the vehicle and mounted thereon, a spacer bar pivoted on the rear of the vehicle for movement about a transverse axis and projecting rearwardly from said vehicle, a carrier plate having means thereon for attachment to a car to be towed, a winch on the vehicle having a rotary drum thereon, a sheave on the rear of the boom, a cable wound around the drum and extending over the sheave, means on the cable supporting the carrier plate, an upwardly projecting hook on the carrier plate engaging a vertical opening through the spacer bar, and said plate having an aperture therein for engagement by the rear extremity of the bar upon deceleration of the vehicle to prevent detachment of the hook.

9. The combination in claim 8 wherein the spacer bar is telescopic, and the sheave is located forwardly of the vertical opening through the spacer bar in all telescopic positions of the latter.

10. In a crane arrangement of the character described, the combination of a vehicle including a main carrier having a carrier member extending along each side, a front and a rear axle, springs supporting the main carrier on the front and rear axles, a supporting frame on the main carrier, a boom pivoted on the supporting frame forwardly of the rear axle, a brace pivoted on the supporting frame forwardly of the rear axle and rearwardly of the pivot mounting of the boom, the pivot mountings of the boom and brace being so positioned relative to the rear axle whereby the load supported by the boom will be transmitted to the vehicle at a point spaced from and forwardly of the rear axle to prevent upending of the vehicle.

11. In a crane arrangement of the character described, the combination of a vehicle including a main carrier having a carrier member extending along each side, a front and a rear axle, springs supporting the main carrier on the front and rear axles, a supporting frame on the main carrier, a boom pivoted on the supporting frame forwardly of the rear axle, a brace pivoted on the supporting frame forwardly of the rear axle and rearwardly of the pivot mounting of the boom, bearing plates mounted on the main carrier forwardly of the rear axle, flanges extending rearwardly from the bearing plates over the rear axle, and auxiliary springs mounted on the rear axle for exerting upward pressure upon the flanges whereby when the auxiliary springs are under load force is exerted longitudinally of the main carrier through the flanges and bearing plates.

ERCEL C. VANDERGRIFT, Sr.
ALFRED NAFFIN.

REFERENCES CITED

The following references are of record in the file of this patent:

UNITED STATES PATENTS

| Number | Name | Date |
|---|---|---|
| 1,461,894 | Deucher | July 17, 1923 |
| 1,551,132 | Butler | Aug. 25, 1925 |
| 1,725,952 | Beebe | Aug. 27, 1929 |
| 1,767,470 | Mitchell | June 24, 1930 |
| 1,794,148 | Collins | Feb. 24, 1931 |
| 2,045,793 | Pearson et al. | June 30, 1936 |
| 2,111,341 | Tetrault | Mar. 15, 1938 |
| 2,145,378 | Trippensee | Jan. 31, 1939 |
| 2,197,406 | Fleming et al. | Apr. 16, 1940 |
| 2,283,443 | Klein | May 19, 1942 |